United States Patent
Yang et al.

(10) Patent No.: US 9,826,349 B1
(45) Date of Patent: Nov. 21, 2017

(54) ACCURACY ESTIMATION AND ENHANCEMENT OF POSITION DATA USING KERNEL DENSITY ESTIMATION

(71) Applicant: Verizon Patent and Licensing Inc., Basking Ridge, NJ (US)

(72) Inventors: Li Yang, Palo Alto, CA (US); Zhengming Xing, Palo Alto, CA (US); Hai Shao, Fremont, CA (US); Ashok N. Srivastava, Mountain View, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/209,301

(22) Filed: Jul. 13, 2016

(51) Int. Cl.
*H04W 4/02* (2009.01)
*H04W 64/00* (2009.01)
*H04L 29/08* (2006.01)
*H04W 24/08* (2009.01)

(52) U.S. Cl.
CPC ............... *H04W 4/02* (2013.01); *H04L 67/02* (2013.01); *H04W 24/08* (2013.01); *H04W 64/00* (2013.01)

(58) Field of Classification Search
CPC .......... H04W 4/02; H04W 64/00; H04L 67/02
See application file for complete search history.

(56) References Cited

U.S. PATENT DOCUMENTS

| | | | |
|---|---|---|---|
| 9,602,965 B1 * | 3/2017 | Kalis ....................... | H04W 4/02 |
| 2013/0212168 A1 * | 8/2013 | Bonasera ............ | G06F 19/3418 709/203 |
| 2015/0073759 A1 * | 3/2015 | Vepakomma ........ | G06Q 50/265 703/6 |
| 2015/0309962 A1 * | 10/2015 | Lichman ................. | H04L 51/32 703/2 |

* cited by examiner

*Primary Examiner* — Christopher M Brandt (57) ABSTRACT

A method and device may estimate the accuracy of position data using kernel density estimator. The method may include receiving, from a plurality of user devices, network requests having embedded position data representing locations of the plurality of user devices. The method further includes extracting, from the network requests over a time period, the embedded position data of a user device associated with the plurality of user devices; and receiving baseline position data representing the locations of the user device over the time period. The method included generating a probability density estimate of the locations of the user device based on a kernel density estimator using the baseline position data, determining accuracy scores for the embedded position data using the probability density estimate of the locations, and filtering the embedded position data to remove outliers from the embedded position data.

20 Claims, 8 Drawing Sheets

ACCURACY ESTIMATION AND ENHANCEMENT OF POSITION DATA USING KERNEL DENSITY ESTIMATION

BACKGROUND

Mobile wireless devices have traditionally included one or more types of position determination capability. Position information of the mobile device may be embedded in network requests for use in various services provided by the network. However, in many instances, the embedded position information may include inaccurate data which may falsely report the position of the mobile device.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to devices which may estimate and enhance the accuracy of position data generated by user devices. The position data may be embedded in network requests (such as, for example clickstream Universal Resource Locators (URLs)), and is referred to herein as "embedded position data." In an embodiment, embedded position data representing the location of a user device may be evaluated using an estimate of a probability density function (referred to herein as a "probability density estimate"). The probability density estimate may be generated based on baseline position data using non-parametric methods, such as, for example, Kernel Density Estimation (KDE). The baseline position data may serve as training data set, and may be obtained from an independent source of position data representing the location of the user device. The baseline data may further include precision information indicating the accuracy of baseline position data, where the precision information may be used improve the accuracy of the probability density estimate. The probability density estimates described herein may be used to improve the coverage and accuracy of the locations of users, to more accurately determine moving trajectories of users, and better determine users' home locations, work locations, etc. The probability density estimates can also be used to tag users' browsing events with high accuracy locations, and to associate users' cyber and physical behaviors. Such information may be useful for targeted advertising actions, improved insights on user behaviors, etc.

Figure 1:
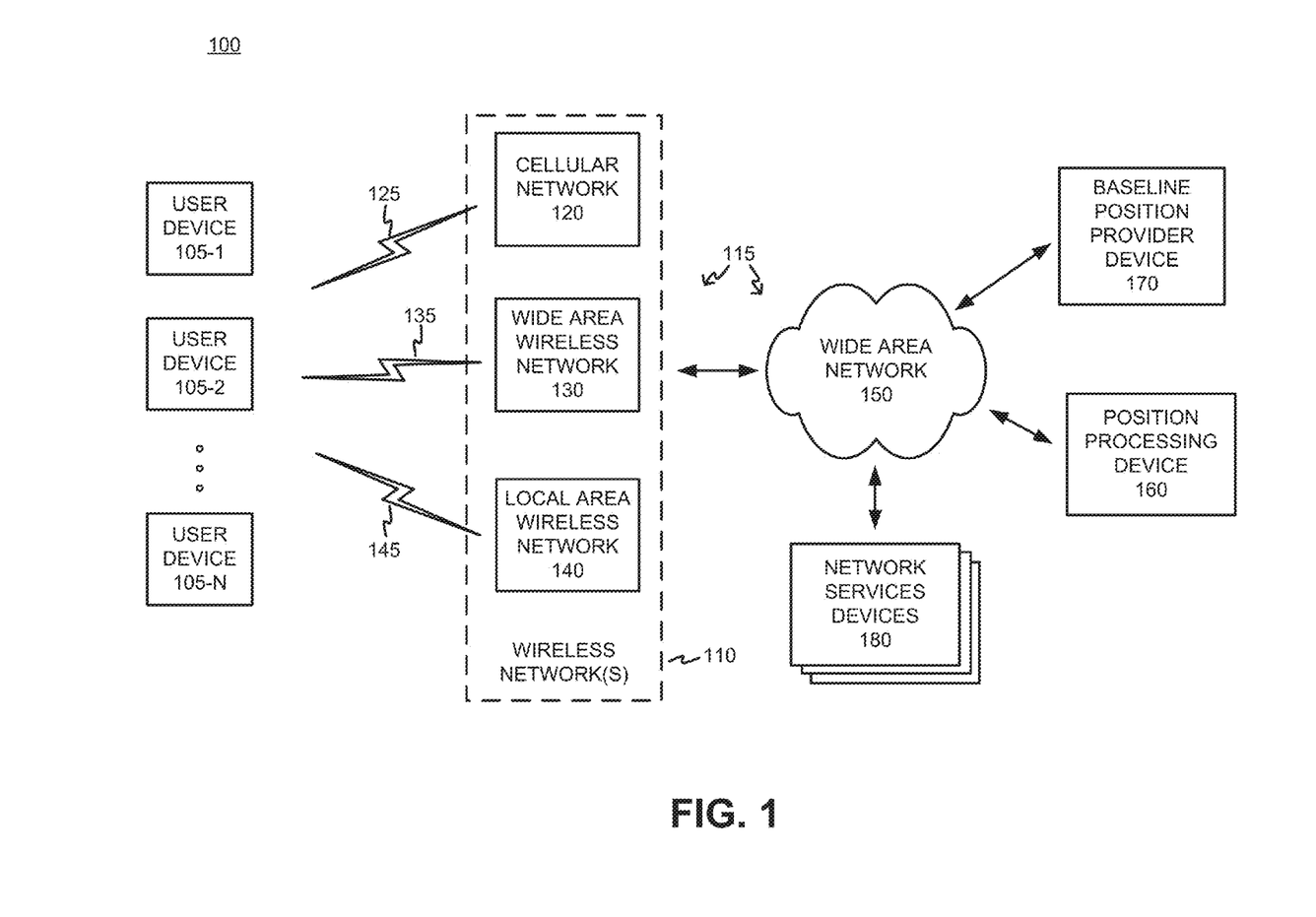
FIG. 1 is a block diagram of an exemplary network environment for estimating and enhancing the accuracy of embedded position data generated by a user device.

FIG. 1 is a block diagram of an exemplary network environment 100 for estimating and enhancing of the accuracy of embedded position data generated by a user device. Network environment 100 may include one or more user devices 105 (referred to generically as "user device 105," plurally as "user devices 105," and specifically as "user device 105-$x$, where $x=1, \ldots, N$), network 115, a position processing device (PPD) 160, a baseline position provider device 170, and network services devices 180. Network 115 may include one or more wireless network(s) 110 and a wide area network 150. Wireless networks 110 may further include, for example, a cellular network 120, a wide area wireless network 130, and/or a local area wireless network 140. For ease of explanation, only one baseline position provider device 170 and PPD 160 are illustrated as being connected to network 115. However, it should be understood that a plurality of PPDs 160, baseline position provider devices 170, and/or other known network entities may be communicatively coupled to network 115. FIG. 1 depicts a representative network environment 100 with exemplary components and configuration shown for purposes of explanation. Other embodiments may include additional or different network entities in alternative configurations than which are exemplified in FIG. 1.

User device 105 may obtain access to network 115 through wireless network(s) 110 over any type of known radio channel or combinations thereof. For example, user device 105 may access cellular network 120 over wireless channel 125. Access over wireless channel 125 may be provided through a base station, eNodeB, etc., within cellular network 120. In various embodiments, cellular network 120, wide area wireless network 130, and/or local area wireless network 140 may also communicate with each other in addition to user device 105. User device 105 may also access network 115 over wireless channel 135 through wide area wireless network 130. Wide area wireless network 130 may include any type wireless network covering larger areas, and may include a mesh network (e.g., IEEE 801.11s) and/or or a WiMAX IEEE 802.16. User device 105 may access network 115 over wireless channel 145 through local area wireless network 140, which may include WiFi (e.g., any IEEE 801.11x network, where $x=a, b, g, n$, and/or ac). The wireless network(s) 110 may exchange data with wide area network 150 that may include backhaul networks, backbone networks, and/or core networks. PPD 160, baseline position provider device 170, and network services devices 180 may interface with wide area network 150, and thus with user device 105 over one or more of the air interfaces 125, 135, 145 through wireless network(s) 110. PPD 160, baseline position provider device 170, and network services devices 180 may communicate with each other via, for example, a back-end private network (not shown) which may be controlled by a network provider. However, as shown in FIG. 1, PPD 160, baseline position provider device 170, and/or network services device 180 may communicate through wide area network 150.

Further referring to FIG. 1, user device 105 may include any type of electronic device having communication capabilities, and thus communicate over network 115 using a variety of different channels, including both wired and wireless connections. User device 105 may include, for example, a cellular radiotelephone, a smart phone, a wearable computer (e.g., a wrist watch, eye glasses, etc.), a tablet, a mobile phone, any type of internet protocol (IP) communications device, a Voice over Internet Protocol (VoIP) device, a laptop computer, a palmtop computer, a gaming device, a media player device, or a digital camera that includes communication capabilities (e.g., wireless communication mechanisms). User device 105 may also include hardware and/or software providing the capability of generating position data representing the location of user device 105. For example, user device 105 may include a receiver compatible with one or more satellite navigation systems to derive absolute and/or relative position data. The satellite navigation systems may include the Global Positioning System (GPS), Global Navigation Satellite System (GLONASS), BeiDou, Galileo, etc. Additionally or alternatively, user device 105 may include an inertial navigation system (INS) including accelerometers, magnetic sensors, and/or gyroscopes for determining position data. In other embodiments, user device 105 may also use network positioning techniques for determining position, in addition to or as a substitute for other methods of position determination. The network positioning techniques may include signal measurements (amplitude, frequency, phase, and/or time delay) and/or packet delay measurements using one or more wireless networks 110 (e.g., cellular network 120, wide area wireless network 130, and/or local area wireless network 150) and/or wide area network 150). For example, using multiple access points to wireless network(s) 110, user devices 105 may perform trilateration techniques to determine their positions.

Wireless network(s) 110 may include one or more wireless networks of any type, such as, for example, a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Wide area network 150 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

PPD 160 may be any type of network device, such as, for example, a server, computer, etc., which may reside in the back-end infrastructure of network environment 100, and may be controlled in whole, or in part, by a network provider. PPD 160 may receive various types of position data representing the location of user devices 105, via wireless networks 110 and/or wide area network 150, and perform processing to estimate and subsequently enhance the accuracy of the embedded position data. To perform the processing, PPD 160 may filter the embedded position data based on probability density estimates derived from baseline position data, where both position datasets represent the locations of user devices 105 over a designated period of time. The embedded position data may be generated by user devices 105 and included in network requests that are sent to different network services devices 180. The network requests, which may include embedded position data, may be forwarded to PPD 160 by the network services devices 180. Alternatively, other network devices may intercept the requests prior to being received by network services devices 180, and forward the network requests to PPD 160, or extract embedded position data (and possibly other pertinent data such as time tags or time stamps) and forward the data extracted from the network requests to PPD 160. In another embodiment, PPD 160 may intercept network requests for extracting embedded position data (and possibly other pertinent data) prior to forwarding the network requests to network service devices 180.

Baseline position provider device 170 may be any type of network device (e.g., a server, computer, etc.) that may be a source of position data used to evaluate the accuracy of the embedded position data generated by user device 105. Baseline position provider device 170 may generate position data representing the location of user device 105 using a data source and/or position determination algorithms which are independent of the embedded position data generated by user device 105. Baseline position provider device 170 may rely on network-based positioning techniques based on trilateration of user device 105. The network-based positioning techniques may rely upon measuring various parameters associated with signals being exchanged with user device 105 and one or more wireless access points. For example, baseline position provider device 170 may use trilateration based on signal and/or packet time measurements associated with delays of signals exchanged between user device 105 and a plurality of wireless access points. The wireless access points may include, for example, cell towers and/or femto cells within cellular network 120, mesh points within a WiFi mesh network, and/or local WiFi wireless access points with local area wireless network 140. Once the baseline position data is determined for user device 105, the baseline position data may be provided to PPD 160 via, for example, wide area network 150.

Network services devices 180 may include any type of network device, such as, for example, a server, computer, a servlet, etc., which may reside in the back-end infrastructure of network environment 100, and may be controlled in whole, or in part, by a network provider. Network services devices 180 may provide various resources in response to requests from user devices 105 received via network 115. Examples of network services devices 180 may include authentication devices for validating requests, content provider devices for providing various forms of media (e.g., text, images, and/or video), advertising servers, logging servers, billing and usage tracking devices, etc.

Figure 2A:
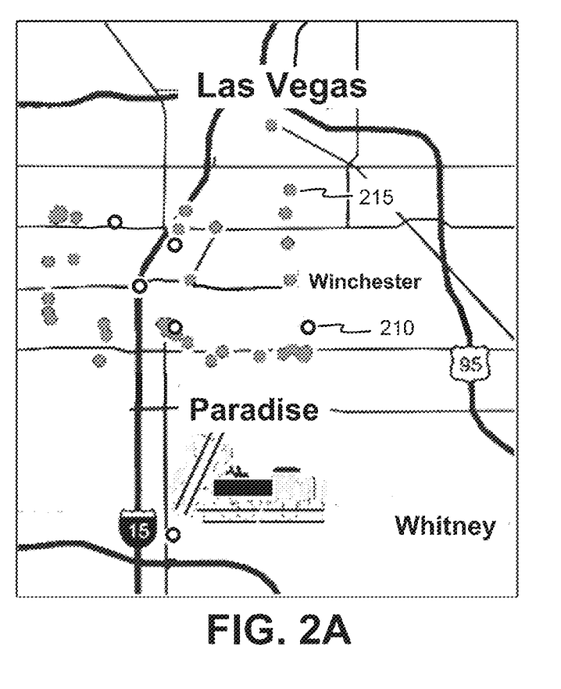
FIGS. 2A and 2B are diagrams illustrating maps showing different types of position data representing the locations of a particular user device over an observation period.
Figure 2B:
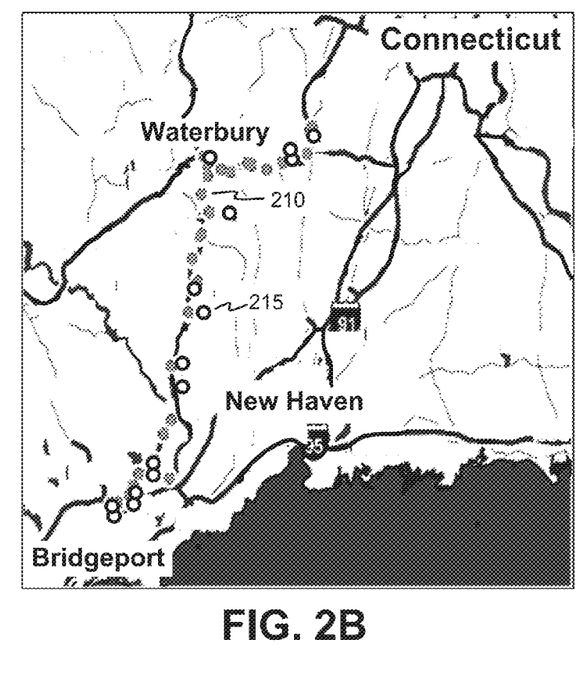

FIGS. 2A and 2B are diagrams illustrating maps showing different types of position data representing the locations of a particular user device 105-*x* over an observation period. Two different types of position data are shown in FIGS. 2A and 2B: embedded position data 210 (delineated by unshaded circles) and baseline position data 215 (delineated by shaded circles).

FIG. 2A shows both embedded position data 210 and baseline position data 215 representing the positions of user device 105-*x* over an observation time period (also referred to herein as "time period") in the vicinity of Las Vegas. FIG. 2A effectively shows the "joining" of the two position data sets, that is, where the embedded position data 210 associated with a particular user device 105-*x* is extracted from monitored network requests from many user devices 105, and is correlated with baseline position data 215 associated with user device 105-x. The variations in position data can be due to noise and/or movement of user device 105-x.

The embedded position data 210 is generated by user device 105-x and included in network requests. The network requests may include a plurality of hypertext transfer protocol (HTTP) requests associated with at least one of user selections, advertising calls, or application calls. For example, embedded position data 210 may be extracted from clickstream URLs that include latitude, longitude, and/or altitude information, such as:

http://ads.mp.mydas.mobi","/getAd?alt=15.749 . . . &lat=40.05809233517636&loc=true &long=–74.86833100294122 &mcc= . . . ; or http://ads.tunein.com/impressions?latlon=41.243243%2C-75.961941&i=1fb50f60 . . . .

Accordingly, the network requests may include HTTP GETS of webpages, advertising calls (ad calls) and from applications running on the user device. An ad call (or an ad request) refers to a request for an advertisement that may occur when one network device requests an ad from another network device. The embedded position data 210 may represent a location in two dimensions, and provided in terms of latitude and longitude in a standard coordinate reference (e.g., WGS 84 geodetic datum). Alternatively, the embedded position data 210 may represent a location in three dimensions, for example, in addition to latitude and longitude, an altitude value may be included. As shown above, the position data may be presented in differing formats within the URL as shown in the two examples above. In other embodiments, the network request may also include time and/or date information associated with the embedded position data. In other embodiments, time and/or date information associated with the position data may be inferred from other sources, such as, for example, time stamp data residing on event logs within a server on a network server log (e.g., within one or more network services devices 180). The time and/or date information may be used to estimate location over a period of time.

Embedded position data 210 for a particular user device 105-x over an observation time period may be the result of collecting information from many user devices 105 over a long period of time by monitoring many network requests (e.g., thousands or millions, such as seven million or more) from a larger number of user devices 105. The embedded position data 210 for a particular user device 105-x over a specified observation time period may be extracted from the information collected from many user devices 105. The embedded position data 210 may be generated by a particular user device 105-x using any position determination approach suitable for mobile device applications. For example, user device 105-x may generate embedded position 210 data using internal positioning hardware, such as, for example, satellite navigation system receivers and/or inertial positioning systems. Additionally or alternatively, user device 105-x may generate embedded position data 210 using network positioning techniques.

The baseline position data 215 may be generated by an entity external to user device 105, such as, for example, baseline position provider device 170. Baseline position provider device 170 may generate position data using information and/or techniques that are independent from those used to generate embedded position data 210. For example, baseline position data 215 would not need to rely on internal positioning hardware residing in user device 105. In an embodiment, baseline position data 215 may be generated using network positioning techniques, such as, for example, techniques that rely on parameters (e.g., delay, phase, frequency, signal strength, convolutional codes, etc.) associated with signals used to communicate with user devices 105. For example, baseline position data 215 may include proprietary and/or standard data products, some of which may use cell tower trilateration to determine the position of user device 105-x. In other embodiments, baseline position data 215 may be derived from delays in packets exchanged with user devices 105 over network 115. Baseline position provider device 170 may also provide information regarding the precision of the baseline position data 215. The precision information may provide a quality estimate of each position datum in the baseline position dataset. The precision information, for example, may represent a 90% error radius of a point. Baseline position provider device 170 may provide additional information associated with the baseline position data, such as, for example, a user device 105-x identifier, a start time and an end time defining the observation time period, and an event type describing an event (e.g., call, message, data) which may trigger position information generation, such as, for example, a user makes a phone call, sends a message, or uses data.

FIG. 2B shows both embedded position data 210 and baseline position data 215 representing the positions of user device 105-x over an observation time period in Connecticut. FIG. 2B effectively shows the "joining" of the two position data sets as particular user device 105-x travels along a freeway. The variations in position data can be assumed to be the result of movement of user device 105-x, as both embedded position data 210 and baseline position data 215 track along a freeway between the cities of Bridgeport and Waterbury.

Figure 3:
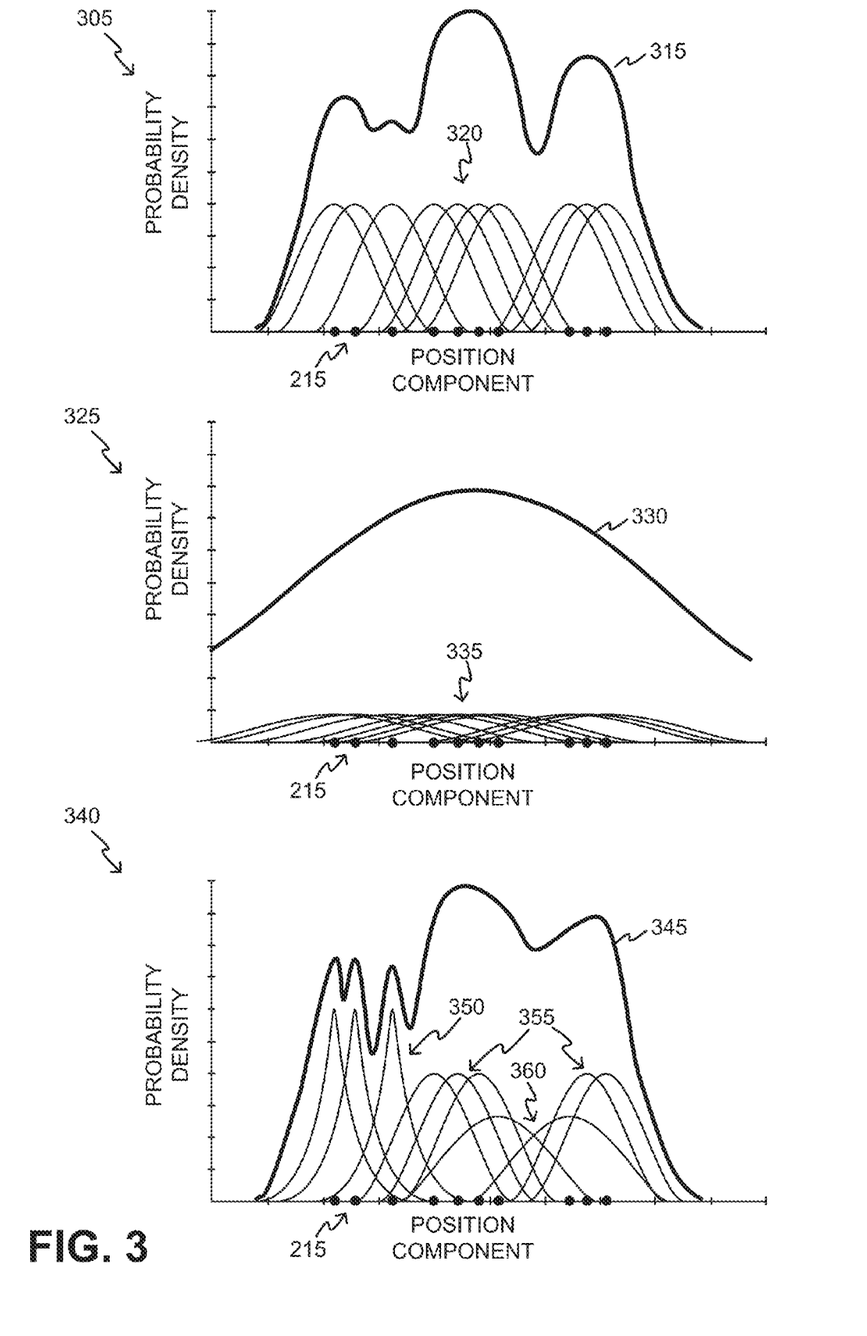
FIG. 3 illustrates plots showing three different one dimensional probability density estimates (PDEs) associated with the same locations of a particular user device.

FIG. 3 illustrates plots 305, 325, 340 showing three different one dimensional probability density estimates (PDEs) 315, 330, and 345 associated with the same locations 215 of a particular user device 105-x. The PDEs of user device 105-x positions are in general multivariable functions having components of position as random variables in two or three dimensions. In some embodiments, additional random variables, such as, for example time, date, etc., may supplement the components of position to increase the dimensionality of the PDE. In most cases, the multidimensional PDEs may be separable, so the PDEs can be mathematically represented as the product of N one-dimensional probability estimates, where N is the number of random variables used in the PDE of user device 105-x position. In other words, N is the dimensionality of the PDE.

For ease of illustration, one dimensional PDEs of user device 105-x position are shown in FIG. 3, where in each plot 305, 325, 340, the horizontal axis labeled "POSITION COMPONENT" may represent a random variable which is a component of position, such as, for example, latitude or longitude, of user device 105-x. Discrete points 215 on the horizontal axis represent baseline position data points (e.g., latitude or longitude). The vertical axis labeled PROBABILITY DENSITY" represents a unitless value indicating the relative likelihood the position takes on a given value. A PDE may serve as an estimate of a probability density function of the location of user device 105-x, and may be used to determine the probability of user device 105-x being within a range of positions by computing the area under the PDE for that given range of positions.

Embodiments herein may utilize any type of statistical technique to estimate the PDE of user device 105-x position, and may include parametric estimation techniques and/or non-parametric estimation techniques. In an embodiment, the probability density estimate may be generated using a kernel density estimation (KDE). The KDE produces a smoothed non-parametric estimate of an entire population using a finite data sample. Unlike histograms, the KDE can provide a smooth, continuous and differentiable density estimate, and is independent of the choice of origin (corresponding to the location of the bins in a histogram). The histogram method may present bin edge problems, and is usually not smooth, thus displaying bumps that may have been observed only due to noise. KDE does not assume any specific underlying distribution and, theoretically, the estimate can converge to any density shape with enough samples. Unlike parametric fitting of a mixture of Gaussians, KDE is a more general approach that does not require the selection of the number of Gaussians to be fitted. Moreover, adaptation of the estimate produced by the KDE is trivial and can be achieved by adding new samples.

In an embodiment, the data sample may be baseline position data 215 of user device 105-x. Mathematically, the PDE of user device 105-x position may be represented with the following equation:

$$f(X) = 1/n \sum_{i=1}^{n} K_h(X-x_i), \quad (1)$$

where the f(X) represents the multidimensional probability density estimate of user device 105-x; n is the number of baseline position points used in the estimate; X is the multidimensional random variable representing the position of user device 105-x; $x_i$ is a baseline position data point; and $K_h(\cdot)$ is a kernel function having a bandwidth h.

As noted above, the PDE may be represented by a two dimensional function of latitude and longitude:

$$f(X) = f(x_{Lat}, x_{Lon}). \quad (2)$$

Upon assuming the random variables for latitude and the longitude are independent, the two dimensional function of latitude and longitude maybe broken down into separable form, and may be represented as a product of two functions, one representing latitude and the other representing longitude:

$$f(X) = f(x_{Lat})f(x_{Lon}), \quad (3)$$

wherein $x_{Lat}$ is a random variable for the latitude component of user device 105-x position, and $x_{Lon}$ is a random variable for the longitude component of user device 105-x position.

When considering the separable form of the PDE shown in Equation (3), the mathematical form shown in Equation (1) may be expressed as follows:

$$f(x_j)_{j \in \{Lat, Lon\}} = \frac{1}{n} \sum_{i=1}^{n} \frac{1}{h_{ij}} K\left(\frac{x_j - x_i}{h_{ij}}\right), \quad (4)$$

where $x_j$ is random variable of latitude or longitude for user device 105-x; $x_i$ is the $i^{th}$ data point out of n data points taken from the baseline position data set 215, K(•) is a kernel function, and $h_{ij}$ is the bandwidth associated with latitude or longitude for the $i^{th}$ data point. In order to determine the likelihood of a particular embedded position data point 210, Equation (4) may be used by substituting the particular embedded position data point 210 value into $x_j$. As will be explained in more detail below, once the substitution of a particular embedded data position point 210 is made, an accuracy score of that embedded data position point 210 may be determined through further manipulations of Equation (4).

The kernel function K(•) may be domain and/or range scaled with the appropriate bandwidth $h_{ij}$ that may be associated with the $i^{th}$ baseline position data point. In an embodiment, the bandwidth $h_{ij}$ may be based on, or take into account, the precision of the $i^{th}$ baseline position data. For example, the bandwidth $h_{ij}$ may be a function of the precision of the baseline data, which, for example, may be inversely proportional to the precision values. In another embodiment, the bandwidth $h_{ij}$ may be determined using so called "balloon estimators." Thus, when a precision of a particular baseline position data point $x_i$ is high, the resulting kernel function K(•) may be narrow and have a higher peak amplitude, thus resulting in contributions to the PDE $f(x_j)$ having greater levels of detail manifested by narrower frequency bands. When the precision of a particular baseline position data point $x_i$ is low, the resulting kernel function K(•) may be wide and have a lower peak amplitude, thus resulting in contributions to the PDE $f(x_j)$ having coarser details, thus appearing to manifested by wider frequency bands. Accordingly, the PDE $f(X_j)_{j \in \{Lat, Lon\}}$ in Equation (4) may be thought of as a variable bandwidth bivariate KDE. The kernel is any weighting function that may be used in non-parametric estimation techniques, such as, for example, a Gaussian function, an Epanechnikov function, etc.

FIG. 3 shows a plot 305 of exemplary PDE 315 having a position component as a random variable. Based on Equation (4), kernel functions 320 are centered at baseline position data points 215, and summed together to generate PDE 315. In the example shown in plot 305, the kernel functions 320 have a constant bandwidth $h1_{ij}$, that is, the bandwidth does not change from one baseline position data point to another. Plot 325 in FIG. 3 shows exemplary PDE 330 also having a position component as a random variable. Based on Equation (4), kernel functions 335 are centered at the same baseline position data points 215, and summed together to generate PDE 330. As with the kernel functions 320 shown in plot 305, the kernel functions 335 have a constant bandwidth $h2_{ij}$. Because $h1_{ij}$ is smaller than $h2_{ij}$, the shape of PDE 315 varies more than the shape in PDE 330. In other words, PDE 330 is smoother than PDE 315 given the kernel functions 335 have a higher bandwidth than the kernel functions 320.

Further referring to FIG. 3, plot 340 shows an exemplary PDE 345 having the same position component as a random variable as shown in plots 305 and 325. However, PDE 345 is generated using kernel functions 350, 355, and 360 having variable bandwidths. As PDE 345 may be generated by centering kernel functions 350, 355, and 360 on their respective baseline position data points 215, and summing the kernel functions 350, 355, and 360 together. In the example shown in plot 340, kernel functions 350 have a lower bandwidth than kernel functions 355 and 360, and thus the contributions of kernel functions 350 provide the highest level of detail to PDE 345. Kernel functions 360 have the highest bandwidth, so the contributions of kernel functions 360 provide the lowest level of detail and result in a smoother PDE 345 in the vicinity of kernel functions 360. Kernel functions 355 have bandwidth values larger than kernel functions 350 and smaller than kernel functions 360. Accordingly, contributions to PDE 345 in the vicinity of kernel functions 355 are smoother than the contributions of kernel functions 350, and have more detail than the contributions of kernel functions 360. The resulting PDE 345 may be a more accurate estimate, as the variable bandwidths of the kernel functions 350, 355, 360 may take the precision of the baseline position data points 215 into account. Thus, where the accuracy of the baseline position data is low, the bandwidth is correspondingly high, and the details of the resulting PDE 345 may be smoother in the vicinity of the lower precision baseline data. In areas where baseline position data accuracy is high, the bandwidth is correspondingly low, so the contributing kernels generate a finer, more detailed PDE 345 in the vicinity of the higher precision baseline data. By varying the bandwidth of the KDE functions 350, 355, and 360 based on the precision of the baseline position data 215, the resulting PDE 345 better reflects the statistics of the position of user device 105-*x*.

Once a PDE 315, 330, 345 has been generated using the baseline position data 215, it may be used to estimate an accuracy score of embedded position data 210. In an embodiment, a single accuracy score may reflect an overall measure of the likelihood of user device 105-*x* to be at a particular location. In an embodiment, the accuracy score s may be a value normalized between 0 and 1, and determined using the following equation:

$$s = \int_{X: f(X) < f(x_k)} f(X) dX, \quad (5)$$

where X is the multidimensional random variable for the position of user device 105-*x* (includes all components of position, e.g., latitude and longitude); f is the PDE 315, 330, 345; and $x_k$ is embedded position data 210 value for which an accuracy score is being determined. Each embedded position data 210 point may be evaluated for accuracy using Equation 5.

Figure 4A:
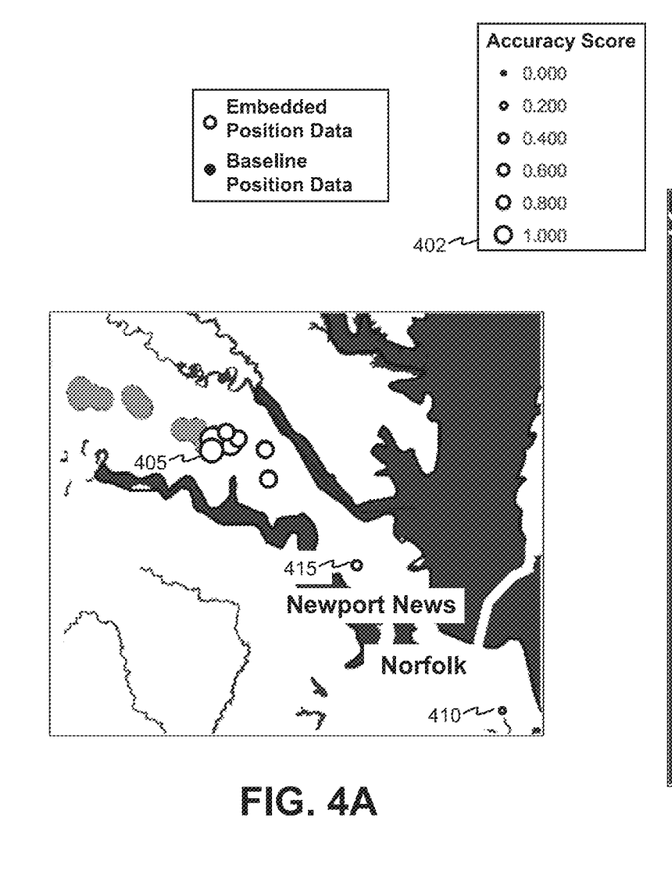
FIGS. 4A and 4B are diagrams illustrating maps showing embedded position data and corresponding baseline position data.
Figure 4B:
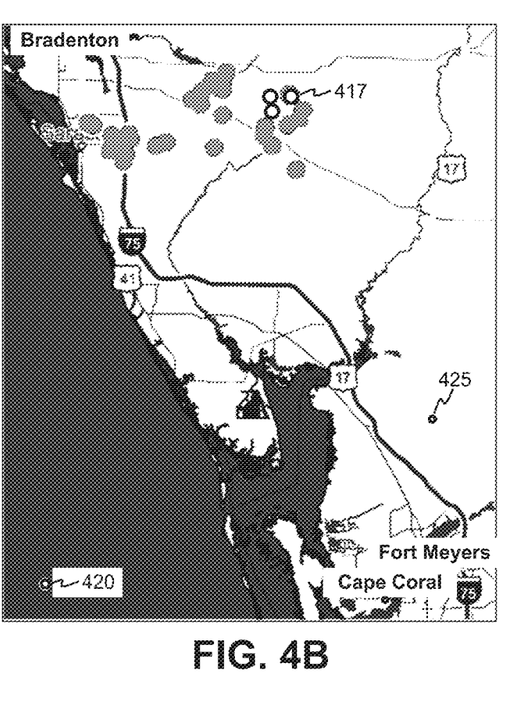

FIGS. 4A and 4B are diagrams illustrating maps showing embedded position data (delineated by unshaded circles) and baseline position data (delineated by shaded circles). In FIGS. 4A and 4B, the accuracy score for the embedded position data is represented by the size of the circle representing the particular embedded position data point. As shown by legend 402, the accuracy score ranges from 0 to 1.000, with the value 1.000 representing the highest accuracy score. As shown in legend 402, the diameter of the circle representing the embedded data point is directly proportional to the accuracy score, with larger diameters representing greater accuracy scores.

FIG. 4A shows both embedded position data and baseline position data representing the positions of user device 105-*x* over an observation time period in the vicinity of Newport News. A number of embedded position points 405 having higher accuracy scores are clustered near a set of baseline position data points, thus the probability of user device 105-*x* having been at the location described by embedded position points 405 is higher than other points positioned away from the cluster of embedded position points 405 and the baseline position points shown in FIG. 4A. For example, embedded position points 410 and 415 have relatively lower accuracy scores, 0.200 and 0.400 respectively, and are located far away from the cluster of embedded position points 405. Embedded position points 410 and 415 may thus be considered outliers, and may be filtered from the set of embedded position points to improve the accuracy of the data set.

FIG. 4B shows both embedded position data and baseline position data representing the positions of user device 105-*x* over an observation time period in the vicinity of Sarasota. A number of embedded position points 417 having higher accuracy scores are clustered near a set of baseline position data points, thus the probability of user device 105-*x* having been at the location described by embedded position points 417 is higher than other points positioned away from the cluster of embedded position points 417 and the baseline position points shown in FIG. 4B. For example, embedded position points 420 and 425 have relatively lower accuracy scores, both being 0.200, and are located far away from the cluster of embedded position points 417, with point 420 reporting a false position in the Gulf of Mexico. Embedded position points 420 and 425 may be considered outliers, and can be filtered from the set of embedded position points to improve the accuracy of the data set.

Figure 5A:
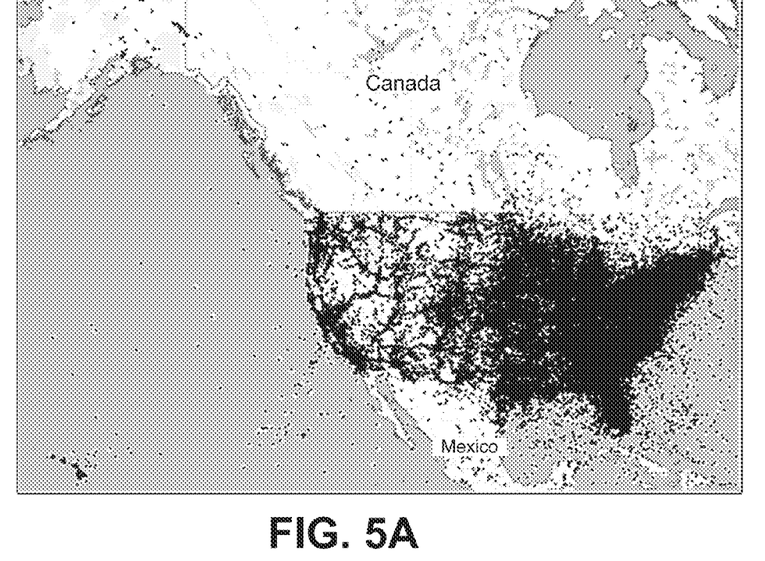
FIGS. 5A and 5B are diagrams illustrating maps showing the effects of filtering the embedded position data for a large number of users.
Figure 5B:
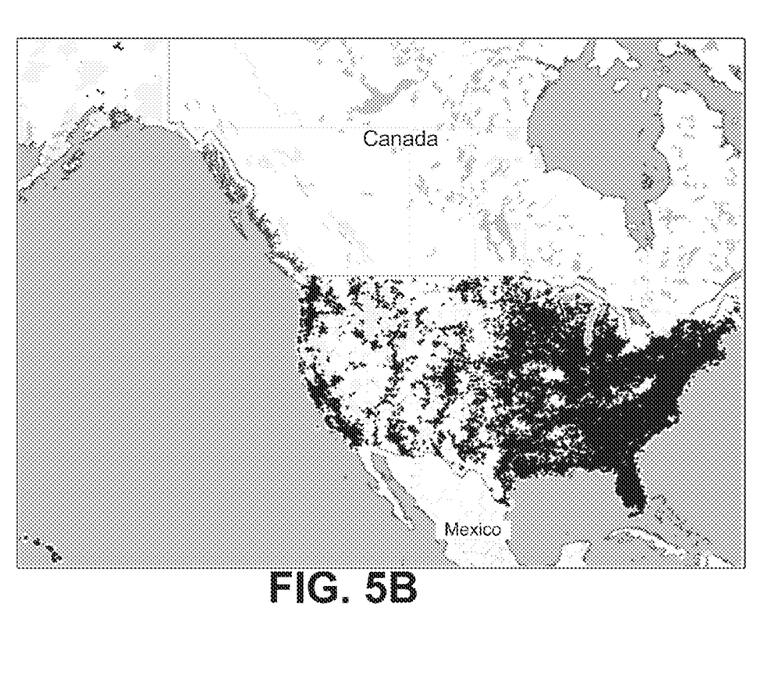

FIGS. 5A and 5B are diagrams illustrating maps showing the effects of filtering the embedded position data for a large number of users within the United States. Filtering the embedded position may be accomplished in a number of ways once the accuracy scores are determined based on the PDEs. In an embodiment, outliers may be filtered from the dataset by thresholding the accuracy scores of the embedded position points, and removing the embedded position points having an accuracy score lower than the threshold. For example, outliers may be identified as embedded position points having an accuracy score less than 0.05, 0.20, 0.40, or some other value. After the outliers are identified, they may be discarded to improve the accuracy of the embedded position data. In other embodiments, different types of filters may be used to remove and/or reduce the mitigating outliers have on the embedded position data. In FIG. 5A, the embedded position data has not been filtered to remove outliers. As a result, many user device locations are erroneously reported as being outside the United States, and are spread across Canada, Mexico, and lying in the Atlantic and Pacific Oceans.

FIG. 5B shows the embedded position data after filtering has been performed. The embedded position data outliers are removed. Thus very few positions are misidentified as being inside Canada, Mexico, and in the oceans. Moreover, the general appearance of the embedded position data within the United States (including Alaska and Hawaii) appears sharper and less diffuse, especially noticeable in densely populated areas having many user devices 105 (e.g., along the East coast from Maine to Florida). Accordingly, filtering the embedded position data based on the PDEs estimated by the KDE improves the accuracy of the embedded position data.

Figure 6:
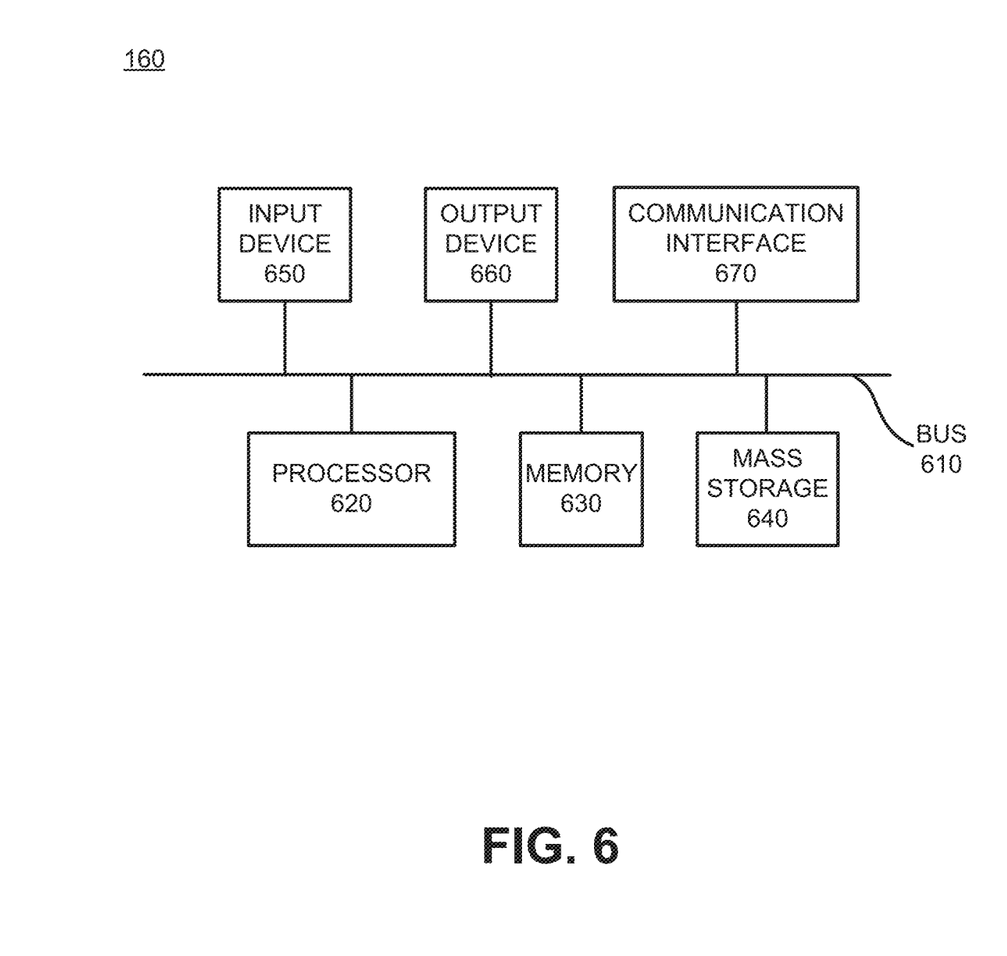
FIG. 6 is a block diagram showing exemplary components of a position processing device (PPD) according to an embodiment.

FIG. 6 is a block diagram showing exemplary components of a position processing device (PPD) 160 according to an embodiment. PPD 160 may include a bus 610, a processor 620, a memory 630, mass storage 640, an input device 650, an output device 660, and a communication interface 670. Other devices in network environment 100, such as baseline position provider device 170, and network services devices 180 may be configured in a similar manner.

Bus 610 includes a path that permits communication among the components of PPD 160. Processor 620 may include any type of single-core processor, multi-core processor, microprocessor, latch-based processor, and/or processing logic (or families of processors, microprocessors, and/or processing logics) that interprets and executes instructions. In other embodiments, processor 620 may include an application-specific integrated circuit (ASIC), a field-programmable gate array (FPGA), and/or another type of integrated circuit or processing logic. For example, processor 620 may be an x86 based CPU, and may use any operating system, which may include varieties of the Windows, UNIX, and/or Linux operating systems. Processor 620 may also use high-level analysis software packages and/or custom software written in any programming and/or scripting languages for interacting with other network entities are communicatively coupled to WAN 150.

Memory 630 may include any type of dynamic storage device that may store information and/or instructions, for execution by processor 620, and/or any type of non-volatile storage device that may store information for use by processor 620. For example, memory 630 may include a random access memory (RAM) or another type of dynamic storage device, a read only memory (ROM) device or another type of static storage device, and/or a removable form of memory, such as a flash memory. Mass storage 640 may include any type of on-board device suitable for storing software and/or large amounts of data, and may include one or more hard drives, solid state drives, and/or various types of redundant array of independent disks (RAID) arrays. Mass storage device 640 is suitable for storing data associated with, for example, user devices 105, embedded position data 210, baseline position data 215, etc.

Input device 650, which may be optional, can allow an operator to input information into PPD 160 if required. Input device 650 may include, for example, a keyboard, a mouse, a pen, a microphone, a remote control, an audio capture device, an image and/or video capture device, a touch-screen display, and/or another type of input device. In some embodiments, PPD 160 may be managed remotely and may not include input device 650. Output device 660 may output information to an operator of PPD 160. Output device 660 may include a display (such as a liquid crystal display (LCD)), a printer, a speaker, and/or another type of output device. In some embodiments, PPD 160 may be managed remotely and may not include output device 660.

Communication interface 670 may include a transceiver that enables PPD 160 to communicate with other devices and/or systems over a network (e.g., wide area network 150, wireless networks 110, etc.). Communications interface 670 may be configured to exchange data over wired communications (e.g., conductive wire, twisted pair cable, coaxial cable, transmission line, fiber optic cable, and/or waveguide, etc.), or a combination of wireless. In other embodiments, communication interface 670 may communicate using a wireless communications channel, such as, for example, radio frequency (RF), infrared, and/or visual optics, etc. Communication interface 670 may include a transmitter that converts baseband signals to RF signals and/or a receiver that converts RF signals to baseband signals. Communication interface 670 may be coupled to one or more antennas for transmitting and receiving RF signals. Communication interface 670 may include a logical component that includes input and/or output ports, input and/or output systems, and/or other input and output components that facilitate the transmission/reception of data to/from other devices. For example, communication interface 670 may include a network interface card (e.g., Ethernet card) for wired communications and/or a wireless network interface (e.g., a WiFi) card for wireless communications. Communication interface 670 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, PPD 160 may perform certain operations relating to estimating and improving the accuracy of embedded position data 210. PPD 160 may perform these operations in response to processor 620 executing software instructions contained in a computer-readable medium, such as memory 630 and/or mass storage 640. The software instructions may be read into memory 630 from another computer-readable medium or from another device. The software instructions contained in memory 630 may cause processor 620 to perform processes described herein. Alternatively, hardwired circuitry may be used in place of, or in combination with, software instructions to implement processes described herein. Thus, implementations described herein are not limited to any specific combination of hardware circuitry and software.

Although FIG. 6 shows exemplary components of PPD 160, in other implementations, PPD 160 may include fewer components, different components, additional components, or differently arranged components than depicted in FIG. 6.

Figure 7:
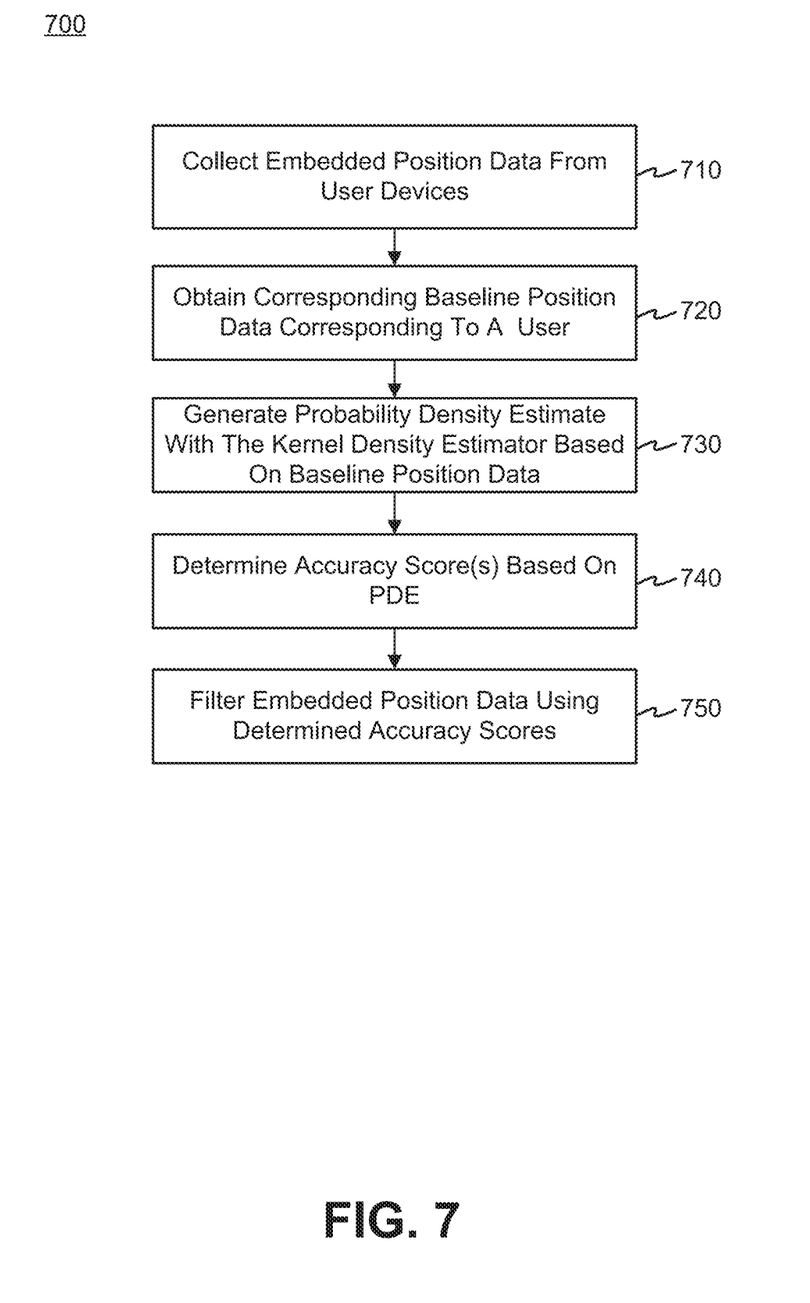
FIG. 7 is a flow chart showing an exemplary process for evaluating and enhancing the accuracy of embedded position data.

FIG. 7 is a flow chart showing an exemplary process 700 for evaluating and enhancing the accuracy of embedded position data 210. In an embodiment, process 700 may be performed at PPD 160, by processor 620 executing instructions stored in memory 630, mass storage device 640, and/or downloaded through communication interface 670.

Initially, PPD 160 may collect embedded position from user device 105-*x* (Block 710). In an embodiment, PPD 160 may receive, from a plurality of user devices 105, network requests having embedded position data representing locations of the plurality of user devices 105. PPD 160 may then extract, from the network requests over an observation time period, the embedded position data of user device 105-*x* associated with the plurality of user devices 105.

In an embodiment, receiving network requests may include receiving hypertext transfer protocol (HTTP) requests associated with user selections, advertising calls, and/or application calls.

PPD 160 may then receive baseline position data representing the locations of user device 105-*x* over the observation time period (Block 720). The baseline position data may be based on cell tower trilateration of user device 105-*x*. In an embodiment, receiving baseline position data may further include receiving precision information associated with the baseline position data.

PPD 160 may generate a probability density estimate (PDE) of the locations of user device 105-*x* based on a kernel density estimator using the baseline position data (Block 730). Generating the PDE of the locations may further include calculating the kernel density estimator using a Gaussian shaped kernel.

PPD 160 may determine accuracy scores for the embedded position data using the PDE of the locations (Block 740). PPD 160 may then filter the embedded position data to remove outliers from the embedded position data (Block 750). Removing outliers from the embedded position data improves the accuracy, so the that the embedded position data better represents the actual location of user device 105-*x*. Removing outliers may further include identifying accuracy scores for embedded position data that fall below a threshold. The threshold may be predetermined and static, or may be based on parameters derived from the PDE and/or vary with respect to the embedded position data points. PPD 160 may then discard embedded position data in response to identifying that the embedded position data that falls below the threshold.

Figure 8:
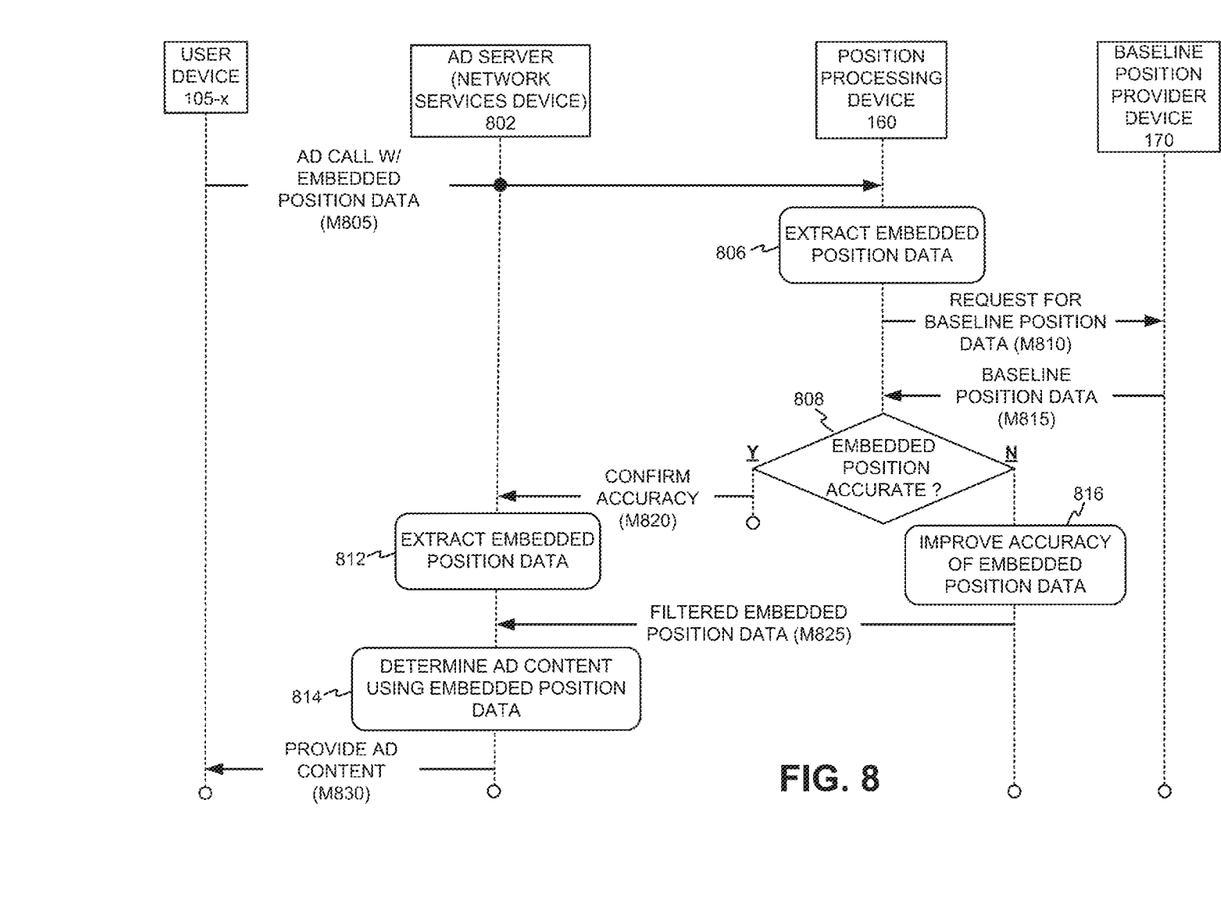
FIG. 8 is a diagram showing exemplary message flows for network advertising where the position of the mobile device may be evaluated and enhanced, if needed, based on the PDE.

FIG. 8 is a diagram showing exemplary message flows for network advertising where the position of mobile device 105-*x* may be evaluated and enhanced, if needed, based on the PDE. In an embodiment, the PDE may be based on the KDE described above in reference to FIGS. 3 and 7.

Initially, user device 105-*x* may send a network request in the form of an ad call (Message M805). The ad call may include embedded position data (e.g., latitude and longitude) representing the location of user device 105-*x*. In an embodiment, the ad call M805 may use clickstream URLs, and may report a plurality of user device 105-*x* locations which may represent a trajectory and/or be may be used in combination to improve location accuracy and reduce noise, as will be described in more below. In an embodiment, ad call M805 may be initially be provided to ad server 802 (which may be considered one of a plurality of network service devices 180 shown in FIG. 1), and subsequently forwarded to PPD 160, as shown in FIG. 8. Alternatively, ad calls M805 may be collected by PPD 160 prior to reaching ad server 802. Once received, PPD 160 may extract the embedded position data from the ad call M805 (Block 806). PPD 160 may then send a request to baseline position provider device 170 for baseline position data (Message M810). In response, baseline position provider device 170 may send the baseline position data for mobile device 105-x (Message M815). PPD 160 may then use the baseline position data to generate a PDE based on KDE, as described above in reference to FIG. 7. PPD 160 may then evaluate the accuracy of the embedded position data received in ad call M805 (Block 808). In an embodiment, the accuracy may be evaluated based an implementation of Equation (5) and thresholding described above in relation to FIGS. 3 and 4A.

Upon verifying that the embedded position data is accurate in Block 808, PPD 160 may send a confirmation (Message M820) verifying the embedded position accuracy to ad server 802. Ad server 802 may then extract the verified embedded position data from ad call M805 (Block 812). Based on the verified position embedded position data, ad server 802 may then determine appropriate location-based content targeted to user device 105-x for the advertisement (Block 814). Ad server 802 may then provide the location-based ad content (Message M830) to mobile device 105-x.

Alternatively, if PPD 160 determines that the embedded position data received in ad call M805 is not accurate, PPD 160 may perform additional processing to improve the accuracy of the embedded position data (Block 816). If ad call M805 includes multiple points of position data (e.g., multiple points of at a static location, and/or a trajectory of a moving user device 105-x), PPD 160 processing in Block 816 may include, for example, thresholding embedded position data based on accuracy scores, and/or performing linear filtering, non-linear filtering, and/or statistical filtering (e.g., Kalman filtering) of embedded position data to reduce noise. In other embodiments, when ad call M805 does not include a large enough number of embedded position data points for processing, PPD 160 may request (either directly or indirectly through ad server 802) additional embedded position data points from user device 105-x, and/or obtain updated baseline position data from baseline position provider device 170 for processing to improve the location accuracy of user device 105-x.

After PPD 160 performs processing to improve the accuracy of embedded position data in Block 816, PPD 160 may then send the filtered embedded position data to ad server 802 (Message M825). In this case, ad server 802 may forgo extracting the embedded position data (i.e., skip Block 812) and use the received filtered embedded position data M825 instead of the embedded position data received in ad call M805. Ad server 802 may then use the filtered embedded position data M825 to determine appropriate location-based content targeted to user device 105-x for the advertisement in Block 814. Ad server 802 may then provide the location-based ad content M830 to mobile device 105-x.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIG. 7, the order of the blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   intercepting network requests sent from a user device via a network to a plurality of network devices, wherein the network requests include embedded position data generated by the user device and representing locations of the user device;
   extracting, from the intercepted network requests over a time period, the embedded position data of the user device and forwarding the intercepted network requests to the plurality of network devices;
   receiving, from another network device, baseline position data representing the locations of the user device over the time period, wherein the baseline position data is generated by the other network device using signals exchanged between the user device and one or more wireless access points associated with the network;

generating a probability density estimate of the locations of the user device based on a kernel density estimator using the baseline position data;

determining accuracy scores for the embedded position data using the probability density estimate of the locations; and filtering the embedded position data to remove outliers from the embedded position data using the determined accuracy scores.

2. The method of claim 1, wherein intercepting the network requests further comprises:

intercepting a plurality of hypertext transfer protocol (HTTP) requests associated with at least one of user selections, advertising calls, or application calls.

3. The method of claim 1, wherein receiving baseline position data further comprises:

receiving precision information associated with the baseline position data.

4. The method of claim 3, wherein generating the probability density estimate of the locations of the user device based on a kernel density estimator further comprises:

calculating the kernel density estimator using a variable bandwidth based on the precision information.

5. The method of claim 1, wherein receiving baseline position data further comprises:

receiving position data based on cell tower trilateration of the user device.

6. The method of claim 1, wherein generating the probability density estimate of the locations of the user device based on a kernel density estimator further comprises:

calculating the kernel density estimator using a Gaussian shaped kernel.

7. The method of claim 1, wherein filtering the embedded position data to remove outliers comprises:

identifying embedded position data having accuracy scores that fall below a threshold; and discarding the identified embedded position data having accuracy scores that fall below the threshold.

8. A device, comprising:

an interface configured to communicate with a network;

a memory configured to store instructions; and a processor, coupled to the interface and the memory, wherein the stored instructions, when executed by the processor, cause the processor to:

intercept network requests sent from a user device via a network to a plurality of network devices, wherein the network requests include embedded position data generated by the user device and representing locations of the user device, extract, from the intercepted network requests over a time period, the embedded position data of the user device and forwarding the intercepted network requests to the plurality of network devices, receive, from another network device, baseline position data representing the locations of the user device over the time period, wherein the baseline position data is generated by the other network device using signals exchanged between the user device and one or more wireless access points associated with the network, generate a probability density estimate of the locations of the user device based on a kernel density estimator using the baseline position data, determine accuracy scores for the embedded position data using the probability density estimate of the locations, and filter the embedded position data to remove outliers from the embedded position data using the determined accuracy scores.

9. The device of claim 8, wherein the instructions to intercept the network requests further cause the processor to:

intercept a plurality of hypertext transfer protocol (HTTP) requests associated with at least one of user selections, advertising calls, or application calls.

10. The device of claim 8, wherein the instructions to receive baseline position data further cause the processor to:

receive precision information associated with the baseline position data.

11. The device of claim 10, wherein the instructions to generate the probability density estimate of the locations of the user device based on a kernel density estimator further cause the processor to:

calculate the kernel density estimator using a variable bandwidth based on the precision information.

12. The device of claim 8, wherein the instructions to receive baseline position data further cause the processor to:

receive position data based on cell tower trilateration of the user device.

13. The device of claim 8, wherein the instructions to generate the probability density estimate of the locations of the user device based on a kernel density estimator further cause the processor to:

calculate the kernel density estimator using a Gaussian shaped kernel.

14. The device of claim 8, wherein the instructions to filter the embedded position data to remove outliers further cause the processor to:

identify embedded position data having accuracy scores that fall below a threshold; and discard the identified embedded position data having accuracy scores that fall below the threshold.

15. A non-transitory computer-readable medium comprising instructions, which, when executed by a processor, cause the processor to:

intercept network requests sent from a user device via a network to a plurality of network devices, wherein the network requests include embedded position data generated by the user device and representing locations of the user device;

extract, from the intercepted network requests over a time period, the embedded position data of the user device and forwarding the intercepted network requests to the plurality of network devices;

receive, from another network device, baseline position data representing the locations of the user device over the time period, wherein the baseline position data is generated by the other network device using signals exchanged between the user device and one or more wireless access points associated with the network;

generate a probability density estimate of the locations of the user device based on a kernel density estimator using the baseline position data;

determine accuracy scores for the embedded position data using the probability density estimate of the locations; and filter the embedded position data to remove outliers from the embedded position data using the determined accuracy scores.

16. The non-transitory computer-readable medium of claim 15, wherein the instructions to intercept the network requests further cause the processor to:

intercept a plurality of hypertext transfer protocol (HTTP) requests associated with at least one of user selections, advertising calls, or application calls.

17. The non-transitory computer-readable medium of claim 15, wherein the instructions to receive baseline position data further cause the processor to:
receive precision information associated with the baseline position data.

18. The non-transitory computer-readable medium of claim 17, wherein the instructions to generate the probability density estimate of the locations of the user device based on a kernel density estimator further cause the processor to:
calculate the kernel density estimator using a variable bandwidth based on the precision information.

19. The non-transitory computer-readable medium of claim 15, wherein the instructions to receive baseline position data further cause the processor to:
receive position data based on cell tower trilateration of the user device.

20. The non-transitory computer-readable medium of claim 15, wherein the instructions to generate the probability density estimate of the locations of the user device based on a kernel density estimator further cause the processor to:
calculate the kernel density estimator using a Gaussian shaped kernel.

* * * * *